W. H. Bradley.
Fishing-Line Reel.
Nº 82,377. Patented Sept. 22, 1868.
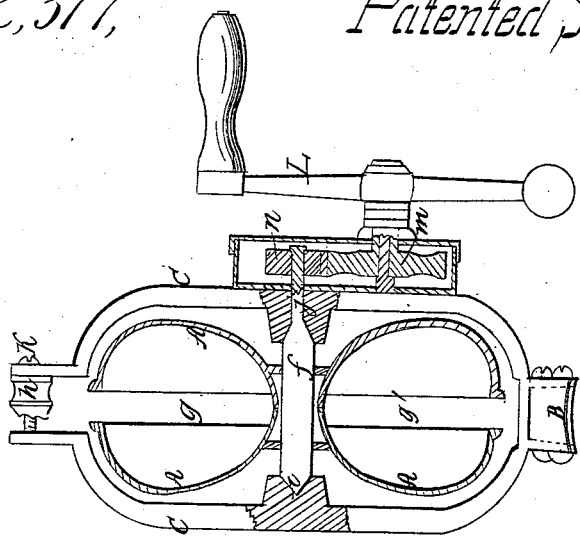
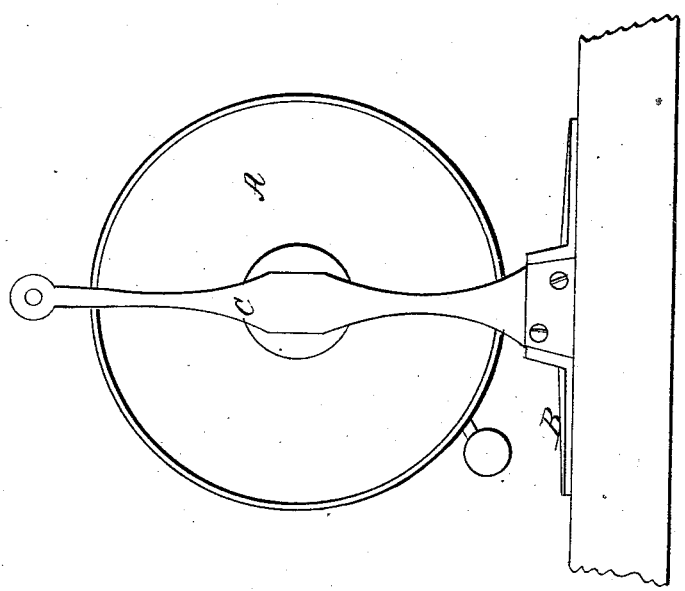
Witnesses:
P. F. Larney
Chas. D. Smith
Inventor:
W. H. Bradley,
by J. Fraser & Co.
attys.
N. PETERS, PHOTO-LITHOGRAPHER, WASHINGTON, D. C.

United States Patent Office.

WILLARD H. BRADLEY, OF NEW YORK, N. Y.

Letters Patent No. 82,377, dated September 22, 1868.

ANGLERS' REEL.

The Schedule referred to in these Letters Patent and making part of the same.

TO ALL WHOM IT MAY CONCERN:

Be it known that I, WILLARD H. BRADLEY, of the city, county, and State of New York, have invented a new and useful Improvement in Fish-Line Reels; and I hereby declare that the following is a full and exact description thereof, reference being had to the accompanying drawings, in which—

Figure 1 is a sectional elevation, and

Figure 2 a vertical cross-section of my improvement.

It is the object of my invention to combine in one instrument the several requisites of a good reel, viz, ease of motion, and rapidity of winding and giving off the line, and a construction that will enable the motion to be stopped by applying the finger as a brake, and one, also, that will prevent the entangling of the line, if it should accidentally unwind.

As shown in the drawings, I construct my reel of two disks, A A, each provided with an annular concavity surrounding its axis, the two being placed on the same shaft, $f$, with their concave sides towards each other, leaving a space, $g$, intervening between, sufficient to allow a free passage for the line. The shaft has conical journals, $i j$, which have their bearings in the frame C, consisting of two standards, which rise from the foot-plate B, which is connected with the fishing-rod B' in any suitable manner. These standards are connected at their top by an intervening piece, $h$, held by the screw $k$, to enable the bearings to be adjusted to regulate the endwise play or motion of the shaft $f$, as the removal of a small portion, $h$, with a file, or substitution of a piece of less dimensions, enables the two standards to be brought closer together by the screw, and the wear of the journal compensated for. Motion is imparted by means of the crank L, connected with a driving-wheel, $m$, which gears with the pinion $n$ on the reel-shaft.

The annular space between the disks, which receives the line as it is wound up, is smaller near the axis, expanding rapidly in width toward the periphery, so that the line, in coiling, builds up rapidly on the spool, and is mainly held in the larger portion of the chamber. The object of this construction is to enable the force employed in throwing out the "sinker" to act upon the reel to the best advantage, by drawing from as great a distance from the axis as possible, so that the line may be thrown a longer distance. The same principle insures its winding up more rapidly by the hand, in which operation the amount of power expended is of no consequence.

In casting out the sinker it is desirable to stop the rotation of the reel as soon as possible after the sinker strikes the water, to prevent waste-line being run off, and this is accomplished in the most convenient manner by making the reel with the smooth and continuous disks A A, so that applying the thumb or finger with slight pressure against the outer side of the reel, preferably at its periphery, acts as a friction-brake, and instantly stops the motion.

The employment of the two disk sides, with an annular space between their peripheries, obviates another trouble of a vexatious nature to the angler while engaged at his occupation, that of having his line becoming entangled or caught in some part of the reel, as there is no small or projecting part on which the line can be caught, and the annular opening for the line permits it to run on or off without friction or impediment.

What I claim as my invention, and desire to secure by Letters Patent, is—

A fish-line reel, composed of the two annular concaved disks A A, as arranged on the shaft $f$, with the space $g$ at their peripheries, in combination with the frame C C, constructed and operating substantially as and for the purposes set forth.

I also claim, in combination with the disks A A and conical journals of the shaft $f$, the frame C C, fixed to the foot-plate B, and provided with the variable connecting-piece $d$, for adjusting the bearings to the shaft, substantially as set forth.

In witness whereof, I have hereunto signed my name in the presence of two subscribing witnesses.

WILLARD H. BRADLEY.

Witnesses:
RICHARD LEE,
G. M. LAWRENCE.